United States Patent [19]
Watanabe et al.

[11] Patent Number: 5,833,917
[45] Date of Patent: Nov. 10, 1998

[54] PROCESS FOR PRODUCTION OF SILICON NITRIDE SINTERED MATERIAL

[75] Inventors: Keiichiro Watanabe, Kasugai; Youky Bessyo, Nishikasugai-gun, both of Japan

[73] Assignee: NGK Insulators, Ltd., Nagoya, Japan

[21] Appl. No.: 879,484

[22] Filed: Jun. 19, 1997

Related U.S. Application Data

[63] Continuation of Ser. No. 460,582, Jun. 2, 1995, abandoned.

[30] Foreign Application Priority Data

Jun. 20, 1994 [JP] Japan .................................. 6-137071

[51] Int. Cl.$^6$ ............................. C03B 15/02; C04B 35/58
[52] U.S. Cl. ........................ 264/683; 501/97.2; 501/97.3
[58] Field of Search .......................... 264/683; 501/97.2, 501/97.3

[56] References Cited

U.S. PATENT DOCUMENTS

| | | |
|---|---|---|
| 5,017,531 | 5/1991 | Ukai et al. . |
| 5,049,530 | 9/1991 | Huckabee et al. . |
| 5,394,015 | 2/1995 | Tsuzuki et al. . |
| 5,411,923 | 5/1995 | Suzuki et al. . |

FOREIGN PATENT DOCUMENTS

| | | |
|---|---|---|
| 62-297269 (A) | 12/1987 | Japan . |
| 2-50076 (B2) | 11/1990 | Japan . |

*Primary Examiner*—Peter Chin
*Assistant Examiner*—Jacqueline A. Ruller
*Attorney, Agent, or Firm*—Kubovcik & Kubovcik

[57] ABSTRACT

In a process for producing a silicon nitride sintered material, a silicon nitride raw material powder selected from raw material powder lots such that the silicon nitride raw material powder has a dispersion $\delta N\beta_1$ of weight fraction of β-silicon nitride, of 65% or less, is used. A process for producing a silicon nitride sintered material controls the firing conditions so that the raw material being fired gives, at any stage of firing, a dispersion $\delta N\beta_2$ of weight fraction of β-silicon nitride, of 65% or less between the surface portion and the central portion. The first process allows for production of a silicon nitride sintered material having excellent properties in high-temperature strength, etc., at a high reproducibility and stability. The second process allows for production, of in any production batch, a silicon nitride sintered material very low in scattering of properties (e.g., density and strength) between the central portion and the surface portion.

8 Claims, 5 Drawing Sheets

PROCESS FOR PRODUCTION OF SILICON NITRIDE SINTERED MATERIAL

This application is a continuation of application Ser. No. 08/460,582, filed Jun. 2, 1995, now abandoned.

BACKGROUND OF THE INVENTION

1. Field of the Invention

The present invention relates to a process for producing a silicon nitride sintered material having high strength even at high temperatures. More particularly, the present invention relates to a process for producing a silicon nitride sintered material having high-temperature strength, by using a silicon nitride raw material powder of controlled properties.

2. Description of the Prior Art

In recent years, the use of silicon nitride sintered material as structural materials or mechanical parts has rapidly expanded owing to its excellency in properties such as high strength, high heat resistance, high corrosion resistance and the like.

Silicon nitride sintered material is produced generally by mixing a silicon nitride raw material powder with a necessary amount of a sintering aid such as $Y_2O_3$, $Al_2O_3$ or the like and firing the mixture.

It has recently been found out that the properties of the silicon nitride raw material powder used, subtly affects the properties of the sintered material obtained, as described below. There are two crystal forms of silicon nitride, i.e. α-silicon nitride consisting of an α phase and β-silicon nitride consisting of a β phase. Past research indicates that silicon nitride as a raw material for sintered silicon nitride preferably contains α-silicon nitride in an amount of 85% or more. However, even when a silicon nitride sintered material is produced using such a silicon nitride raw material powder containing α-silicon nitride in an amount of 85% or more, it happens in some cases that the silicon nitride sintered material obtained varies greatly in properties between production batches, depending upon the small scattering in properties present between silicon nitride raw material powders of different lots, making it impossible to produce a silicon nitride sintered material having high strength at high temperatures, at a high reproducibility and stability.

SUMMARY OF THE INVENTION

Accordingly, it is an object of the present invention to provide a silicon nitride sintered material free from the above problem of the prior art.

It is a further object of the present invention to provide a silicon nitride sintered material having excellent properties, at a high reproducibility and stability.

The present inventors made a study in order to accomplish the above objects. As a result, the present inventors found out that such a silicon nitride sintered material can be obtained by using a silicon nitride raw material powder arbitrarily selected from those raw material lots each having a predetermined weight fraction of β-silicon nitride and giving, between them, a given dispersion of said weight fraction. The finding has led to the completion of the present invention.

According to the present invention, there is provided, as a first aspect, a process for producing a silicon nitride sintered material, which comprises using, in each production batch, a silicon nitride raw material powder arbitrarily selected from those raw material lots giving a dispersion $\delta N\beta_1$ of weight fraction of β-silicon nitride, of 65% or less, said weight fraction of β-silicon nitride and said dispersion $\delta N\beta_1$ being defined by the following formulas (1) and (2), respectively, molding the silicon nitride raw material powder to obtain a molded material, and firing the molded material.

Weight fraction of β-silicon nitride in each silicon nitride raw material powder, $N\beta$ (%)=[(β-silicon nitride (wt. %)]/{[α-silicon nitride (wt. %)]+[β-silicon nitride (wt. %)]}×100 (1)

$\delta N\beta_1$ (%)=[(maximum $N\beta$(%)−minimum $N\beta$(%))/(average $N\beta$(%))]×100 (2)

Herein, "raw material lot" refers to a unit amount of a raw material of apparently uniform quality, obtained by mixing or the like.

In the present invention, it is also possible to produce a silicon nitride sintered material which has, between production batches, small scattering in properties such as density, strength and the like, by using, as a raw material, a mixture obtained by mixing silicon nitride raw material powders of different lots giving a dispersion $\delta N\beta_1$ of weight fraction of β-silicon nitride, of 65% or less.

According to the present invention, there is further provided, as a second aspect, a process for producing a silicon nitride sintered material, which comprises controlling the firing conditions so that the raw material being fired gives, at any stage of firing, a dispersion $\delta N\beta_2$ of weight fraction of β-silicon nitride, of 65% or less between the surface portion and the central portion, said weight fraction of β-silicon nitride and said dispersion $\delta N\beta_2$ being defined by the following formulas (3) and (4), respectively.

Weight fraction of β-silicon nitride in surface portion or central portion of raw material being fired, $N\beta$ (%)=[(β-silicon nitride (wt. %)]/{[α-silicon nitride (wt. %)]+[β-silicon nitride (wt. %)]}×100 (3)

$\delta N\beta_2$ (%)=[($N\beta$(%) of surface portion−$N\beta$(%) of central portion)/ (average of above two $N\beta$s(%))]×100 (4)

DETAILED DESCRIPTION OF THE INVENTION

Figure 1:
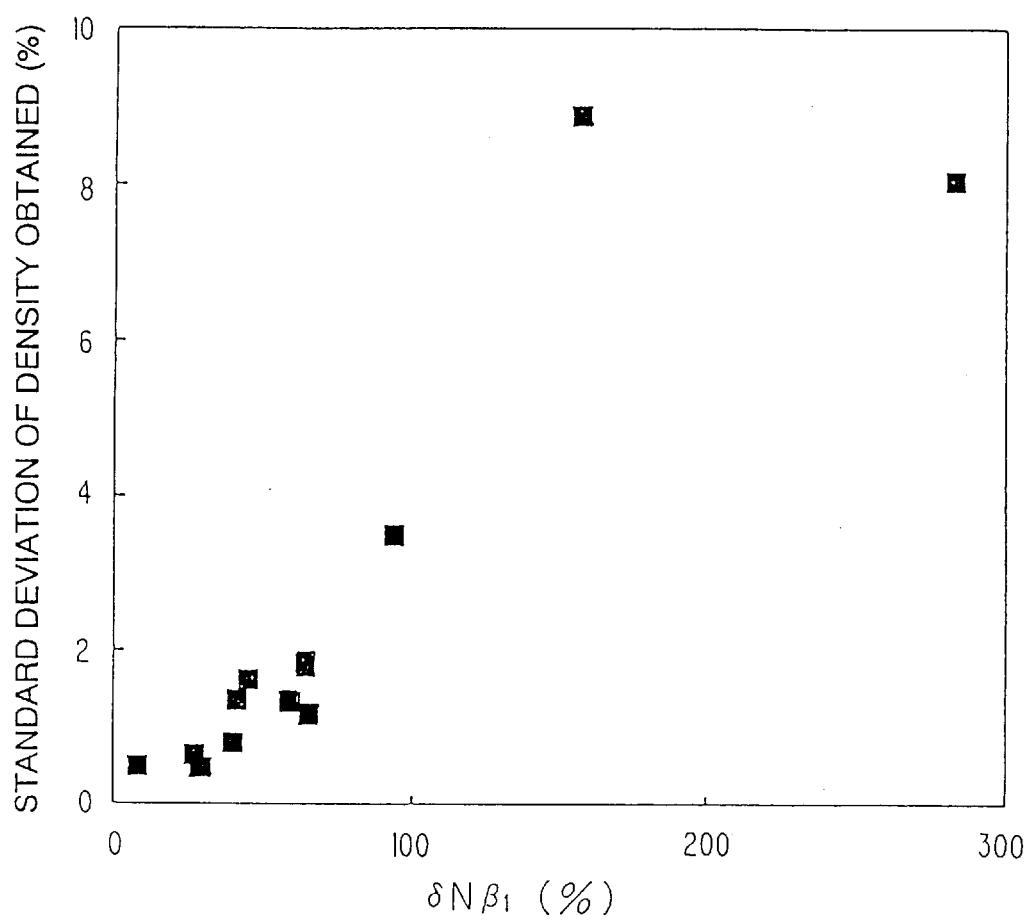
FIG. 1 is a graph showing the relation between dispersion $\delta N\beta_1$ and obtained density, shown in Table 2.

In the process for producing a silicon nitride sintered material according to the first aspect of the present invention, there is used, in each production batch, a silicon nitride raw material powder arbitrarily selected from those raw material lots giving a dispersion $\delta N\beta_1$ of weight fraction of β-silicon nitride, of 65% or less, preferably 50% or less, more preferably 28% or less. Further, the silicon nitride raw material powder used has a weight fraction $N\beta$ of β-silicon nitride, of preferably 3.0% or less, more preferably 1.8–2.8%.

When $\delta N\beta_1$ is more than 65%, even if the silicon nitride raw material powder used has a weight fraction $N\beta$ of β-silicon nitride, of 3.0% or less, the resulting silicon nitride sintered material has a large scattering in density and strength between production batches.

When the weight fraction $N\beta$ of β-silicon nitride is more than 3.0%, the growth of columnar crystals associated with the phase transition from α phase to β phase during firing is suppressed and the proportion of columnar crystals of high aspect ratio in the sintered material is low; consequently, the resulting silicon nitride sintered material tends to have low strength at high temperatures.

It becomes necessary in some cases to use a mixed silicon nitride raw material powder consisting of different raw material lots. In such cases, by using a mixed silicon nitride raw material powder preferably having a weight fraction $N\beta$ of β-silicon nitride, of 3.0% or less, obtained by mixing silicon nitride powders of different lots giving a dispersion $\delta N\beta_1$ of weight fraction of β-silicon nitride, of 65% or less, there can be produced a silicon nitride sintered material having a small scattering in properties (e.g. density and strength) between production batches.

In the present invention, the weight fraction $N\beta$ (%) of β-silicon nitride in silicon nitride raw material powder was measured by the Rydberg analysis of powder X-ray diffraction pattern (see Journal of Materials Science, Vol. 19, pp. 3115–3120, 1984 by F. Izumi, M. Mitomo and Y. Bando). According to the conventional X-ray diffractometry, it is difficult to measure the proportion of a component contained in a small amount of 5% by weight or less, with high accuracy and it is impossible to produce, for example, a silicon nitride raw material powder having an $N\beta$ of 3.0% or less, at high reproducibility. However, the Rydberg analysis can determine a crystal phase of a small amount with high accuracy.

In the second aspect of the present invention, the firing conditions are controlled so that the raw material being fired gives, at any stage of firing, a dispersion $\delta N\beta_2$ of weight fraction of β-silicon nitride, of 65% or less, desirably 50% or less, more desirably 28% or less between the surface portion and the central portion. By controlling the firing conditions as above, the temperature of the surface portion of the raw material being fired becomes higher than the temperature of the central portion during the firing, and the weight fraction $N\beta$ (%) of β-silicon nitride in the surface portion becomes larger than that in the central portion. As a result, the resulting silicon nitride sintered material has low scattering in properties (e.g. strength) between the surface portion and the central portion and also has low scattering in properties between production batches. The study by the present inventors indicates that when the $\delta N\beta_2$ in the raw material being fired is more than 65%, there appear differences in firing atmosphere and firing conditions between the inside and outside of said material during the firing (particularly the firing of thick material) and there tends to appear a difference in speed of phase transition from α phase to β phase between the inside and the outside; as a result, nonuniformity in density appears between the inside and the outside, and the resulting silicon nitride sintered material itself comes to have nonuniform quality in density, strength, etc.

In the process of the second aspect, unlike in the process of the first aspect, it is not necessary to control the weight fraction of β-silicon nitride in silicon nitride raw material powder and the dispersion of weight fraction of β-silicon nitride between different lots of silicon nitride raw material powder, in respective specified ranges. In other words, it is not necessary to use such a particular silicon nitride raw material powder. In the process of the second aspect, it is only necessary that at any stage of firing, the dispersion of weight fraction of β-silicon nitride between the surface portion and central portion of the raw material being fired, be controlled at 65% or less.

Specific control of said dispersion of weight fraction of β-silicon nitride at 65% or less during firing can be conducted, for example, by holding the raw material being fired, at predetermined temperatures during firing.

During firing, there appears nonuniformity in temperature distribution in firing furnace, nonuniformity in heat conduction, and nonuniformity in temperature distribution in the raw material being fired; as a result, nonuniformity in the crystal phase tends to appear between the inside and the outside of raw material being fired. This nonuniformity can be eliminated by the above temperature holding during firing.

The predetermined temperatures at which the raw material is held during firing are not restricted as to the temperatures and frequency. The conditions for temperature holding can appropriately be set depending upon the sintering aid used and the silicon nitride raw material lot used. For example, it is possible to keep the raw material being fired, at a temperature at which the nonuniformity in crystal phase begins to appear between the inside and outside of said material. Change of temperature increase rate or temporary temperature decrease during firing is also effective for elimination of the above-mentioned nonuniformity in crystal phase. The conditions for elimination of nonuniformity by these methods can be determined by conducting preliminary tests prior to the actual production of the sintered material. These conditions, however, cannot be set as a general guideline because of variations in molded material arrangement in furnace, atmosphere used inside furnace, type and capacity of furnace, etc.

Specific control of firing conditions is described below.

Figure 4:
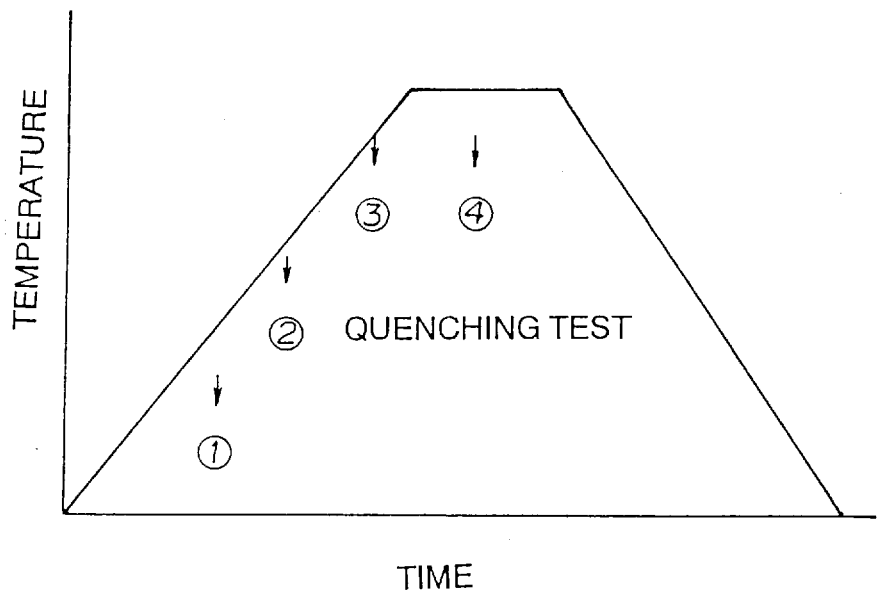
FIG. 4 is a graph showing when quenching was conducted during firing to determine the weight fraction of β-silicon nitride in silicon nitride during firing.
Figure 5:
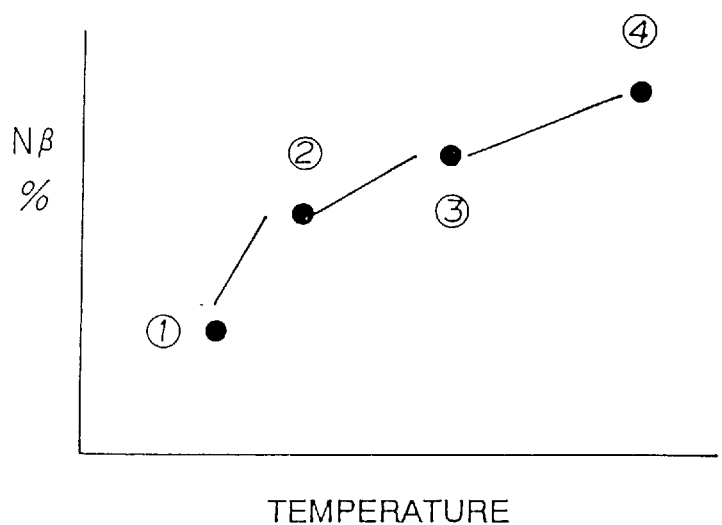
FIG. 5 is a graph showing a change in weight fraction of β-silicon nitride during firing.

First, the weight fraction of β-silicon nitride in silicon nitride being fired can be measured, for example, by applying the method described in Ceramic Transactions, Vol. 7, pp. 674–686, 1990, published by American Ceramic Society. In this method, the raw material being fired is quenched during firing as shown in FIG. 4 and the crystal state of said material right before quenching is kept, and the weight fraction of β-silicon nitride in said material right before quenching can be known as shown in FIG. 5. Therefore, by conducting quenching at various stages of firing according to the firing program, the weight fractions of β-silicon nitride at said stages can be measured at room temperature. The rate of quenching must be as high as about 5,000° C./hr. The reason is that a low quenching rate gives nonuniform progress of sintering and nonuniform cooling of raw material being fired, reducing the accuracy of measurement. The measurement of crystal phase in raw material being fired or sintered material is conducted by X-ray diffractometry (the Rydberg analysis for a crystal phase of small-amount component), as in the case of silicon nitride raw material powder.

The silicon nitride raw material powder used in the present invention can be produced by various methods such as direct nitrification of metal silicon powder, nitrification of silica powder by reduction, imide decomposition and the like. Of these methods, the imide decomposition is most preferred because it can control, as desired, the properties of powder produced, such as proportions of crystal phases, content of inside oxygen, diameter of primary particles, diameter of secondary particles, specific surface area and the like. In the imide decomposition, the properties of powder produced can be controlled, for example, by appropriately setting the conditions (e.g. packing density, temperature elevation rate, maximum temperature kept, time of temperature holding) of the firing and crystallization of amorphous silicon nitride (a thermal decomposition product of silicon imide).

In the present invention, the above-mentioned particular silicon nitride raw material powder is mixed with a necessary amount of a sintering aid such as $Y_2O_3$, $Yb_2O_3$, $Al_2O_3$ or the like; the mixture is molded into a desired shape; and the molded material is fired under the predetermined conditions to obtain a silicon nitride sintered material. The conditions of firing are generally 1,700°–2,000° C. (firing temperature), normal pressure to 9.8 atm (pressure of nitrogen which is a firing atmosphere) and 1–8 hours (firing time).

The silicon nitride sintered material produced in the present invention has a high strength particularly at high temperatures and is small in scattering of properties between production batches or between the inside and outside of the sintered material. Therefore, it can suitably be used as high-temperature structural materials for thermal engines such as a diesel engine or a gas turbine, or mechanical parts, all used at high temperatures and requiring a high reliability for strength.

The present invention is hereinafter described in more detail by way of Examples. However, the present invention is not restricted to these Examples.

EXAMPLES 1–9 AND COMPARATIVE EXAMPLES 1–3

Each of five silicon nitride powder lots (Nos. 1–5) having a weight fraction Nβ (%) of β-silicon nitride shown in Table 1 and giving a dispersion $\delta N\beta_1$ (%) of said weight fraction shown in Table 1 was mixed with 3% by weight of $Y_2O_3$ and 7% by weight of $Al_2O_3$ to obtain a mixed powder. To each mixed powder was added 50% by weight, based on the mixed powder, of water and they were dispersed and mixed in a pot mill for 24 hours. Each resulting slurry was pulverized by spray drying to obtain a molding powder. Each molding powder was subjected to cold isostatic press at a pressure of 1 ton/cm². Each molded material obtained was fired in a nitrogen atmosphere of 9 kg/cm² at 1,900° C. for 3 hours to obtain a silicon nitride sintered material.

Figure 2:
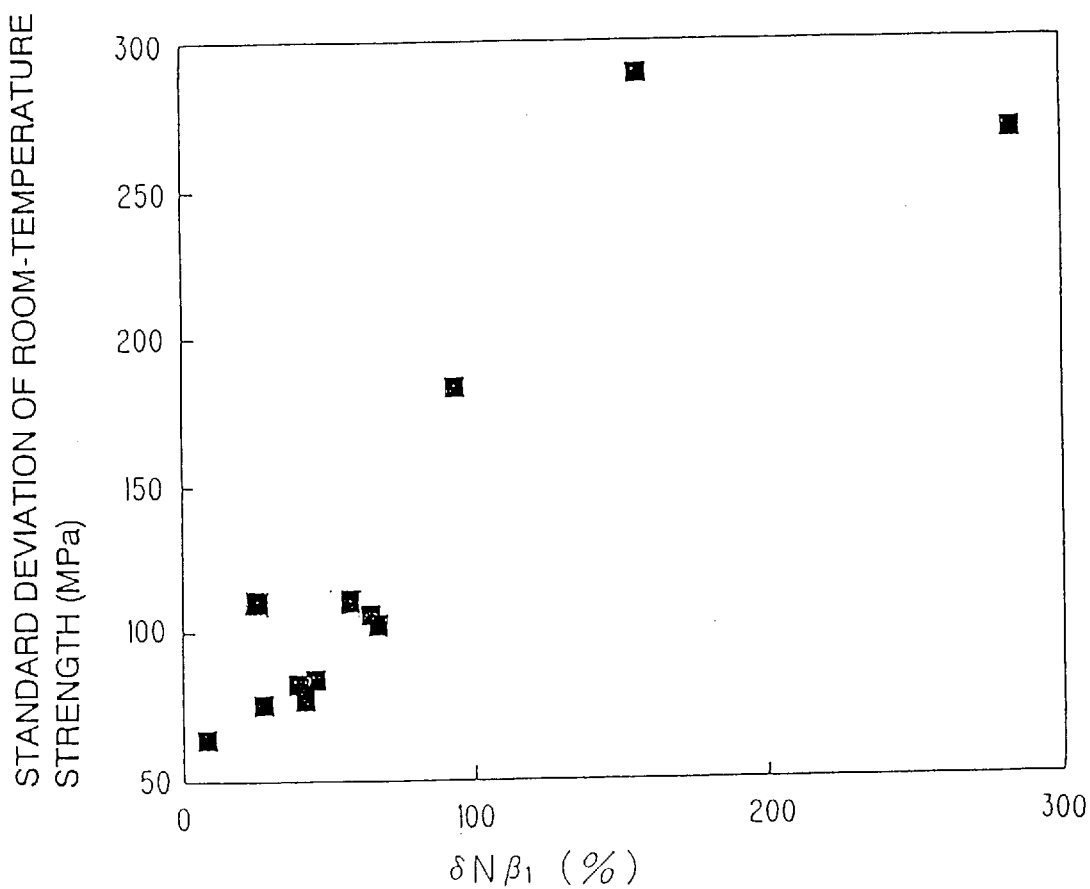
FIG. 2 is a graph showing the relation between dispersion $\delta N\beta_1$ and room temperature-strength, shown in Table 3.
Figure 3:
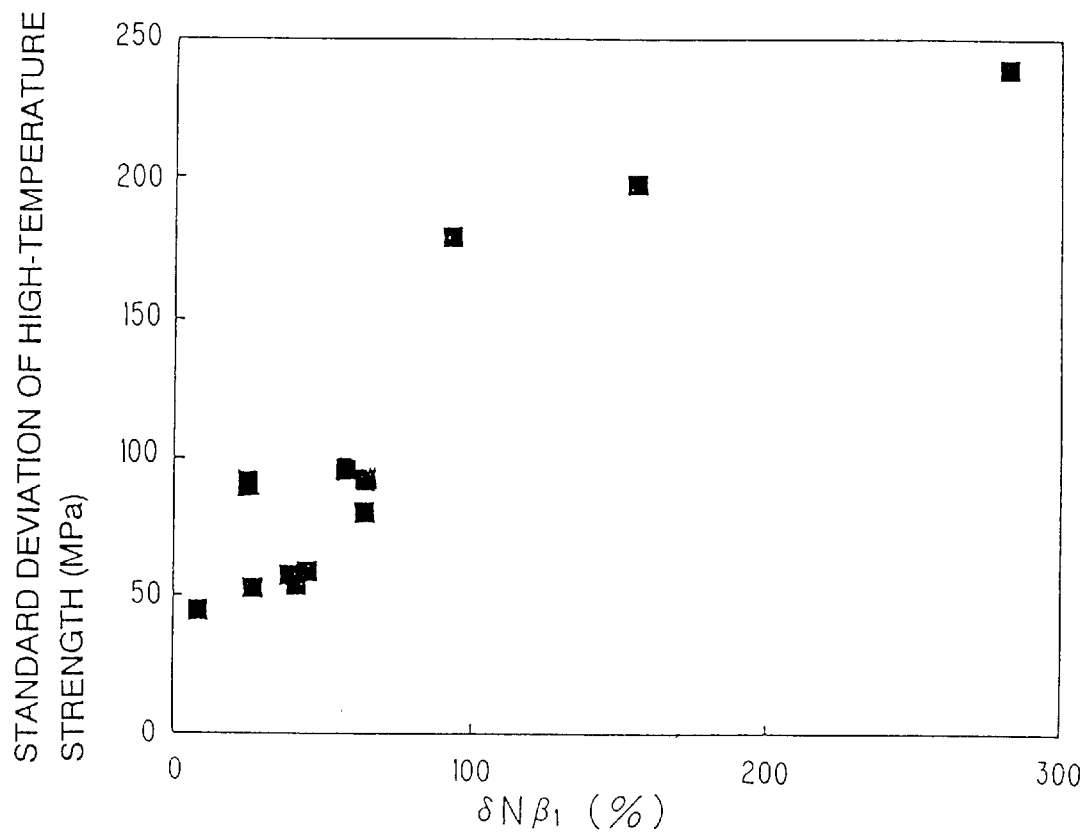
FIG. 3 is a graph showing the relation between dispersion $\delta N\beta_1$ and high temperature-strength, shown in Table 4.

Each silicon nitride sintered material was measured for density, bending strength at room temperature and bending strength at 1,300° C. Incidentally, bending strength was measured by JIS R 1601. The results are shown in Tables 2–4 and FIGS. 1–3.

TABLE 1

| | | Nβ (%) | | | | | | | |
|---|---|---|---|---|---|---|---|---|---|
| | | Raw material lot No. | | | | | | | |
| | $\delta N\beta_1$ (%) | 1 | 2 | 3 | 4 | 5 | Average | Maximum | Minimum |
| Examples | | | | | | | | | |
| 1 | 8.4 | 2.3 | 2.3 | 2.4 | 2.4 | 2.5 | 2.4 | 2.5 | 2.3 |
| 2 | 27.1 | 2.2 | 2.5 | 2.6 | 2.7 | 2.9 | 2.6 | 2.9 | 2.2 |
| 3 | 39.8 | 1.9 | 2.0 | 2.0 | 2.6 | 2.8 | 2.3 | 2.8 | 1.9 |
| 4 | 41.3 | 2.0 | 2.2 | 2.4 | 2.5 | 3.0 | 2.4 | 3.0 | 2.0 |
| 5 | 44.7 | 1.9 | 2.0 | 2.5 | 2.9 | 3.0 | 2.5 | 3.0 | 1.9 |
| 6 | 64.1 | 1.5 | 2.0 | 2.4 | 2.8 | 3.0 | 2.3 | 3.0 | 1.5 |
| 7 | 29.4 | 4.2 | 4.5 | 4.5 | 5.0 | 5.6 | 4.8 | 5.6 | 4.2 |
| 8 | 64.5 | 4.3 | 5.2 | 5.2 | 6.0 | 8.0 | 5.7 | 8.0 | 4.3 |
| 9 | 57.1 | 10.0 | 12.0 | 15.0 | 15.0 | 18.0 | 14.0 | 18.0 | 10.0 |
| Comparative Examples | | | | | | | | | |
| 1 | 93.5 | 1.0 | 1.2 | 2.8 | 2.7 | 3.0 | 2.1 | 3.0 | 1.0 |
| 2 | 156.3 | 0.5 | 2.3 | 2.4 | 4.2 | 5.0 | 2.9 | 5.0 | 0.5 |
| 3 | 282.6 | 0.2 | 1.2 | 2.0 | 2.4 | 8.0 | 2.8 | 8.0 | 0.2 |

TABLE 2

| | | Density obtained (%) | | | | | | | | |
|---|---|---|---|---|---|---|---|---|---|---|
| | | Raw material lot No. | | | | | | | | Standard |
| | $\delta N\beta_1$ (%) | 1 | 2 | 3 | 4 | 5 | Average | Maximum | Minimum | deviation |
| Examples | | | | | | | | | | |
| 1 | 8.4 | 98 | 98 | 99 | 99 | 98 | 98.4 | 99 | 98 | 0.5 |
| 2 | 27.1 | 97 | 98 | 97 | 97 | 96 | 97.0 | 98 | 96 | 0.6 |
| 3 | 39.8 | 95 | 97 | 97 | 97 | 96 | 96.4 | 97 | 95 | 0.8 |
| 4 | 41.3 | 96 | 98 | 99 | 99 | 96 | 97.6 | 99 | 96 | 1.4 |
| 5 | 44.7 | 94 | 97 | 99 | 97 | 96 | 96.6 | 99 | 94 | 1.6 |
| 6 | 64.1 | 93 | 96 | 99 | 97 | 96 | 96.2 | 99 | 93 | 1.9 |

TABLE 2-continued

|   | $\delta N\beta_1$ (%) | Density obtained (%) | | | | | | | | Standard deviation |
|---|---|---|---|---|---|---|---|---|---|---|
|   |   | Raw material lot No. | | | | | | | | |
|   |   | 1 | 2 | 3 | 4 | 5 | Average | Maximum | Minimum | |
| 7 | 29.4 | 96 | 96 | 97 | 97 | 96 | 96.4 | 97 | 96 | 0.5 |
| 8 | 64.5 | 95 | 96 | 96 | 98 | 98 | 96.6 | 98 | 95 | 1.2 |
| 9 | 57.1 | 95 | 95 | 96 | 98 | 98 | 96.4 | 98 | 95 | 1.4 |
| Comparative Examples | | | | | | | | | | |
| 1 | 93.5 | 90 | 91 | 96 | 97 | 88 | 92.4 | 97 | 88 | 3.5 |
| 2 | 156.3 | 80 | 99 | 99 | 83 | 80 | 88.2 | 99 | 80 | 8.9 |
| 3 | 282.6 | 80 | 93 | 99 | 96 | 80 | 89.6 | 99 | 80 | 8.1 |

TABLE 3

|   | $\delta N\beta_1$ (%) | Room-temperature strength (MPa) | | | | | | | | Standard deviation |
|---|---|---|---|---|---|---|---|---|---|---|
|   |   | Raw material lot No. | | | | | | | | |
|   |   | 1 | 2 | 3 | 4 | 5 | Average | Maximum | Minimum | |
| Examples | | | | | | | | | | |
| 1 | 8.4 | 990 | 960 | 1100 | 1110 | 980 | 1028 | 1110 | 960 | 64 |
| 2 | 27.1 | 980 | 990 | 1120 | 1150 | 980 | 1044 | 1150 | 980 | 75 |
| 3 | 39.8 | 920 | 960 | 1000 | 1110 | 870 | 972 | 1110 | 870 | 81 |
| 4 | 41.3 | 870 | 1050 | 1100 | 1020 | 1000 | 1008 | 1100 | 870 | 77 |
| 5 | 44.7 | 990 | 1020 | 1110 | 1200 | 980 | 1060 | 1200 | 980 | 84 |
| 6 | 64.1 | 900 | 980 | 1000 | 1220 | 1020 | 1024 | 1220 | 900 | 106 |
| 7 | 29.4 | 900 | 920 | 1000 | 1200 | 1100 | 1024 | 1200 | 900 | 113 |
| 8 | 64.5 | 910 | 980 | 960 | 1200 | 1100 | 1030 | 1200 | 910 | 105 |
| 9 | 57.1 | 980 | 960 | 990 | 1200 | 1210 | 1068 | 1210 | 960 | 112 |
| Comparative Examples | | | | | | | | | | |
| 1 | 93.5 | 650 | 660 | 960 | 1100 | 700 | 814 | 1100 | 650 | 183 |
| 2 | 156.3 | 500 | 1050 | 1115 | 560 | 440 | 733 | 1115 | 440 | 289 |
| 3 | 282.6 | 540 | 580 | 1200 | 800 | 450 | 714 | 1200 | 450 | 269 |

TABLE 4

|   | $\delta N\beta_1$ (%) | High-temperature strength (MPa) | | | | | | | | Standard deviation |
|---|---|---|---|---|---|---|---|---|---|---|
|   |   | Raw material lot No. | | | | | | | | |
|   |   | 1 | 2 | 3 | 4 | 5 | Average | Maximum | Minimum | |
| Examples | | | | | | | | | | |
| 1 | 8.4 | 681 | 660 | 758 | 765 | 674 | 708 | 765 | 660 | 45 |
| 2 | 27.1 | 675 | 682 | 773 | 794 | 675 | 720 | 794 | 675 | 52 |
| 3 | 39.8 | 641 | 669 | 697 | 774 | 606 | 677 | 774 | 606 | 57 |
| 4 | 41.3 | 604 | 730 | 765 | 709 | 695 | 701 | 765 | 604 | 54 |
| 5 | 44.7 | 687 | 708 | 771 | 834 | 680 | 736 | 834 | 680 | 59 |
| 6 | 64.1 | 600 | 679 | 693 | 847 | 707 | 705 | 847 | 600 | 80 |
| 7 | 29.4 | 480 | 490 | 580 | 700 | 680 | 586 | 700 | 480 | 92 |
| 8 | 64.5 | 450 | 480 | 720 | 610 | 560 | 564 | 720 | 450 | 96 |
| 9 | 57.1 | 490 | 460 | 700 | 660 | 650 | 592 | 700 | 460 | 97 |

TABLE 4-continued

| | | High-temperature strength (MPa) | | | | | | | | |
|---|---|---|---|---|---|---|---|---|---|---|
| | | Raw material lot No. | | | | | | | | Standard |
| | $\delta N\beta_1$ (%) | 1 | 2 | 3 | 4 | 5 | Average | Maximum | Minimum | deviation |
| Comparative Examples | | | | | | | | | | |
| 1 | 93.5 | 300 | 320 | 650 | 750 | 470 | 498 | 750 | 300 | 178 |
| 2 | 156.3 | 339 | 724 | 750 | 381 | 297 | 498 | 750 | 297 | 197 |
| 3 | 282.6 | 359 | 387 | 821 | 841 | 296 | 541 | 841 | 296 | 239 |

As is clear from these results, when a silicon nitride sintered material is produced using a silicon nitride raw material powder arbitrarily selected from different production lots giving a dispersion $\delta N\beta_1$ of weight fraction $N\beta$ of $\beta$-silicon nitride, of 65% or less, the silicon nitride sintered material has high strength at room temperature and high temperatures and provides uniform quality between different production batches. A $N\beta$ of 3.0% or less gives a silicon nitride sintered material of higher quality.

EXAMPLES 10–15 AND COMPARATIVE EXAMPLES 4–7

Disc-shaped molded materials of 80 mm (diameter) and 25 mm (thickness) were produced by the same mixing and molding in Examples 1–9 except that silicon nitride raw material powders having an average weight fraction $N\beta$ of $\beta$-silicon nitride shown in Table 5 and giving a dispersion $\delta N\beta_1$ of weight fraction shown in Table 5 were used.

Figure 6:
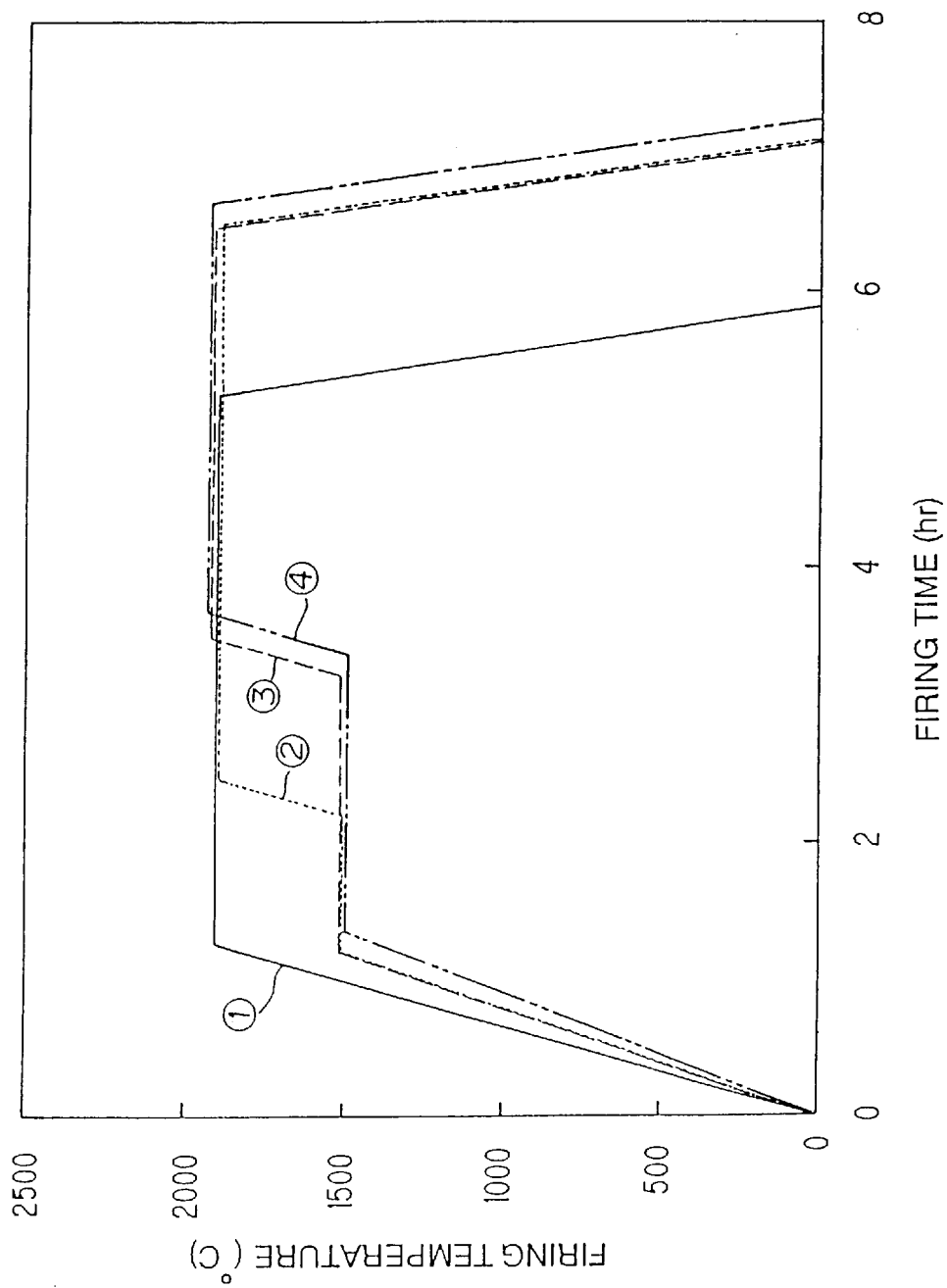
FIG. 6 is a graph showing the firing conditions applied in Examples 10–15 and Comparative Examples 4–7.

Each molded material was sintered in a nitrogen atmosphere of 9 kg/cm² under the firing conditions shown in FIG. 6 and Table 5. During the sintering, quenching was conducted at 1,600° C., 1,700° C., 1,800° C. and 1,900° C. as shown in Table 6; after each quenching, one test piece of 4 mm (thickness)×3 mm×40 mm was cut out from the central portion ("central" in thickness) and the surface portion of the quenched material and measured for crystal phases to calculate the weight fraction $N\beta$ of $\beta$-silicon nitride of each test piece and a dispersion $\delta N\beta_2$ of weight fraction between the two test pieces. Two test pieces were cut out also from each sintered material and each measured for density, bending strength at room temperature and bending strength at 1,300° C. Incidentally, bending strength was measured by JIS R 1601. The results are shown in Table 7.

As is clear from these results, a molded material, which gives a dispersion $\delta N\beta_2$ exceeding 65% during firing, becomes a sintered material which greatly scatters in properties such as density and strength between the central portion and the surface portion.

TABLE 5

| Examples | Comparative Examples | Average $N\beta$ of raw material powder | $\delta N\beta_1$ | Temperature elevation rate ① (°C./hr) | Hold temperature ① (°C.) | Time of temperature holding ① (hr) | Temperature elevation rate ② (°C./hr) | Hold temperature ② (°C.) | Hold time ② (hr) | Cooling rate (°C./hr) | graph No. |
|---|---|---|---|---|---|---|---|---|---|---|---|
| 10 | | 2.5 | 15 | — | — | — | 1500 | 1900 | 4 | 3000 | ① |
| 11 | | 2.4 | 24 | — | — | — | 1500 | 1900 | 4 | 3000 | ① |
| 12 | | 2.3 | 48 | — | — | — | 1500 | 1900 | 4 | 3000 | ① |
| | 4 | 3.5 | 70 | — | — | — | 1500 | 1900 | 4 | 3000 | ① |
| 13 | | 3.5 | 70 | 1250 | 1500 | 1 | 1500 | 1900 | 4 | 3000 | ② |
| | 5 | 5.0 | 98 | — | — | — | 1500 | 1900 | 4 | 3000 | ① |
| 14 | | 5.0 | 98 | 1250 | 1500 | 2 | 1500 | 1900 | 3 | 3000 | ③ |
| | 6 | 9.0 | 189 | — | — | — | 1500 | 1900 | 4 | 3000 | ① |
| | 7 | 9.0 | 189 | 1250 | 1500 | 1 | 1500 | 1900 | 4 | 3000 | ② |
| 15 | | 9.0 | 189 | 1100 | 1500 | 2 | 1500 | 1900 | 3 | 3000 | ② |

TABLE 6

| | | 1600° C. × 0 Hr quenching | | | 1700° C. × 0 Hr quenching | | | 1800° C. × 0 Hr quenching | | | 1900° C. × 0 Hr quenching | | |
|---|---|---|---|---|---|---|---|---|---|---|---|---|---|
| Examples | Comparative Examples | $N\beta$ % Central Portion | $N\beta$ % Surface Portion | $\beta_2$ % | $N\beta$ % Central Portion | $N\beta$ % Surface Portion | $\beta_2$ % | $N\beta$ % Central Portion | $N\beta$ % Surface Portion | $\beta_2$ % | $N\beta$ % Central Portion | $N\beta$ % Surface Portion | $\beta_2$ % |
| 10 | | 20 | 21 | 4.9 | 58 | 59 | 1.7 | 96 | 97 | 1.0 | 99 | 100 | 1.0 |
| 11 | | 22 | 24 | 8.7 | 57 | 63 | 10.0 | 97 | 98 | 1.0 | 99 | 100 | 1 0 |
| 12 | | 21 | 25 | 17.4 | 56 | 64 | 13.3 | 96 | 99 | 3.1 | 99 | 100 | 1.0 |
| | 4 | 15 | 33 | 75.0 | 41 | 61 | 41.6 | 95 | 98 | 3.1 | 98 | 99 | 1.0 |

TABLE 6-continued

| Examples | Comparative Examples | 1600° C × 0 Hr quenching | | | 1700° C. × 0 Hr quenching | | | 1800° C. × 0 Hr quenching | | | 1900° C. × 0 Hr quenching | | |
|---|---|---|---|---|---|---|---|---|---|---|---|---|---|
| | | Nβ % Central Portion | Nβ % Surface Portion | β$_2$ % | Nβ % Central Portion | Nβ % Surface Portion | β$_2$ % | Nβ % Central Portion | Nβ % Surface Portion | β$_2$ % | Nβ % Central Portion | Nβ % Surface Portion | β$_2$ % |
| 13 | | 21 | 22 | 4.7 | 56 | 58 | 3.5 | 97 | 98 | 1.0 | 99 | 100 | 1.0 |
| | 5 | 12 | 32 | 90.9 | 32 | 69 | 73.3 | 95 | 98 | 3.1 | 98 | 100 | 2.0 |
| 14 | | 19 | 22 | 14.6 | 58 | 63 | 8.3 | 96 | 98 | 2.1 | 99 | 100 | 1.0 |
| | 6 | 9 | 33 | 114.3 | 25 | 60 | 82.4 | 93 | 98 | 5.2 | 97 | 100 | 3.0 |
| | 7 | 12 | 26 | 73.7 | 45 | 62 | 31.8 | 96 | 97 | 1.0 | 98 | 100 | 2.0 |
| 15 | | 18 | 22 | 20.0 | 56 | 61 | 8.5 | 97 | 98 | 1.0 | 99 | 100 | 1.0 |

TABLE 7

| Examples | Comparative Examples | Central portion | | | Surface portion | | |
|---|---|---|---|---|---|---|---|
| | | Relative density % | Room-temperature strength MPa | 1300° C. strength MPa | Relative density % | Room-temperature strength MPa | 1300° C. strength MPa |
| 10 | | 98 | 1000 | 710 | 99 | 1100 | 700 |
| 11 | | 98 | 1020 | 720 | 99 | 1105 | 710 |
| 12 | | 97 | 1010 | 680 | 99 | 1090 | 720 |
| | 4 | 88 | 700 | 300 | 99 | 1000 | 700 |
| 13 | | 98 | 950 | 590 | 99 | 1110 | 720 |
| | 5 | 85 | 500 | 250 | 99 | 980 | 650 |
| 14 | | 97 | 1010 | 610 | 99 | 1120 | 730 |
| | 6 | 78 | 250 | 200 | 99 | 950 | 700 |
| | 7 | 80 | 310 | 210 | 99 | 980 | 680 |
| 15 | | 97 | 1020 | 690 | 99 | 1100 | 670 |

As described above, according to the process of the present invention, a silicon nitride sintered material having excellent properties (e.g. high-temperature strength) can be produced at a high reproducibility and stability by using a silicon nitride raw material powder arbitrarily selected from those raw material lots giving a dispersion $\delta N\beta_1$ of weight fraction of β-silicon nitride, of 65% or less or by using a mixture of such silicon nitride raw material powders.

According to the process of the present invention, a silicon nitride sintered material having a high-temperature strength and being very low in scattering of properties (e.g. density and strength) between the central portion and the surface portion can be produced in any production batch by controlling the firing conditions so that the raw material being fired gives, at any stage of firing, a dispersion $\delta N\beta_2$ of weight fraction of β-silicon nitride, of 65% or less between the surface portion and the central portion.

What is claimed is:

1. A method of providing reproducibility and stability of properties among silicon nitride sintered bodies produced in different production batches where a different silicon nitride raw material powder is used in said different production batches, comprising mixing one or more lots of a plurality of different lots of silicon nitride raw material powder with a sintering aid, molding a resultant mixture into a desired shape, and firing the resultant molded mixture to obtain a sintered body, said plurality of lots of silicon nitride raw material powder having a dispersion $\delta N\beta_1$ of weight fraction of β-silicon nitride of 65% or less, wherein $$N\beta\ (\%) = \frac{\beta\text{-silicon nitride (wt. \%)}}{\alpha\text{-silicon nitride (wt. \%)} + \beta\text{-silicon nitride (wt. \%)}} \times 100$$

and $$\delta N\beta_1 = \frac{\text{maximum } N\beta\ (\%) - \text{minimum } N\beta\ (\%)}{\text{average } N\beta\ (\%)} \times 100.$$

2. A method of producing sintered silicon nitride materials of consistent properties in different production batches from a plurality of lots of a silicon nitride raw material powder comprising:

(a) providing a plurality of lots of a silicon nitride raw material powder, said plurality of lots of silicon nitride raw material powder having a dispersion $\delta N\beta_1$ of weight fraction Nβ of β-silicon nitride of 65% or less;

(b) molding one or more lots of said plurality of lots of silicon nitride raw material powder;

(c) firing the resultant molded body in a production batch; and (d) repeating steps (b) and (c) one or more times using one or more different lots from said plurality of lots of silicon nitride raw material powder, whereby sintered silicon nitride materials of consistent properties are obtained, wherein $$N\beta\ (\%) = \frac{\beta\text{-silicon nitride (wt. \%)}}{\alpha\text{-silicon nitride (wt. \%)} + \beta\text{-silicon nitride (wt. \%)}} \times 100$$

and $$\delta N\beta_1 = \frac{\text{maximum } N\beta \, (\%) - \text{minimum } N\beta \, (\%)}{\text{average } N\beta \, (\%)} \times 100.$$

3. A method for producing a sintered silicon nitride material, comprising:

providing a silicon nitride raw material powder, molding the silicon nitride raw material powder to obtain a molded material, and firing the molded material under controlled conditions so that the molded material being fired has at any stage of firing, a dispersion $\delta N\beta_2$ of weight fraction $N\beta$ of $\beta$-silicon nitride of 65% or less between a surface portion and a central portion thereof, said weight fraction of $\beta$-silicon nitride in said surface portion or said central portion and said dispersion $\delta N\beta_2$ being defined by the following formulas (3) and (4), respectively, $$N\beta \, (\%) = \frac{\beta\text{-silicon nitride (wt. \%)}}{\alpha\text{-silicon nitride (wt. \%)} + \beta\text{-silicon nitride (wt. \%)}} \times 100 \quad (3)$$

and $$\delta N\beta_2 = \frac{\text{maximum } N\beta \, (\%) - \text{minimum } N\beta \, (\%)}{\text{average } N\beta \, (\%)} \times 100, \quad (4)$$

wherein said controlled conditions include one or more of holding the molded material being fired at a predetermined temperature, changing the rate of temperature increase or temporarily decreasing the firing temperature.

4. A method according to claim 1, wherein a mixture obtained by mixing silicon nitride powders of different lots to provide said mixture with a dispersion $\delta N\beta_1$ of weight fraction of $\beta$-silicon nitride, of 65% or less, is used as a lot of said plurality of different lots of silicon nitride raw material powder.

5. A method according to claim 1, wherein the dispersion $\delta N\beta_1$ of weight fraction of $\beta$-silicon nitride is 50% or less.

6. A method according to claim 1, wherein the silicon nitride raw material powder has a weight fraction $N\beta$ of $\beta$-silicon nitride of 3.0% or less.

7. A method according to claim 1, wherein the silicon nitride raw material powder has a weight fraction $N\beta$ of $\beta$-silicon nitride of 1.8%–2.8%.

8. A method for producing a sintered silicon nitride material according to claim 3, wherein the dispersion $\delta N\beta_2$ of weight fraction $N\beta$ of $\beta$-silicon nitride is 50% or less.

* * * * *